Jan. 29, 1952
P. B. MAGEE
BIASING PROTECTIVE SYSTEM FOR
HIGH-POWER OSCILLATORS
Filed Nov. 26, 1949
2,583,785
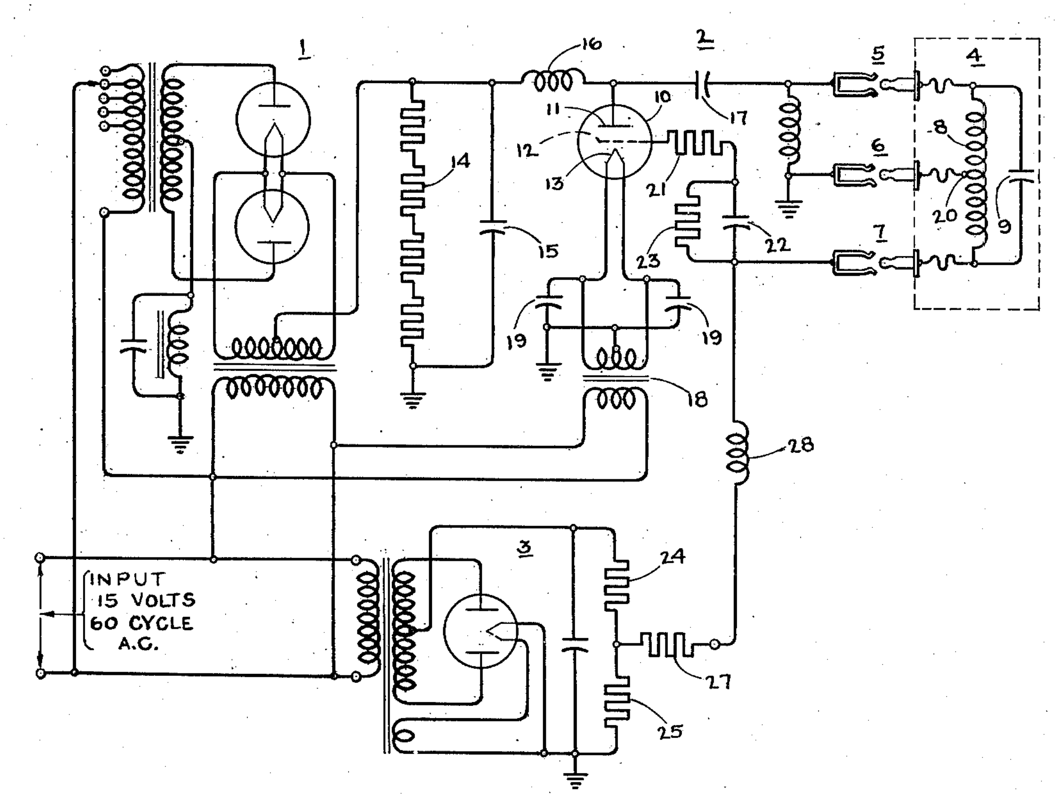
Inventor:
Paul B. Magee,
by Merton D. Morse
His Attorney.

Patented Jan. 29, 1952 2,583,785

UNITED STATES PATENT OFFICE 2,583,785

BIASING PROTECTIVE SYSTEM FOR HIGH-POWER OSCILLATORS

Paul B. Magee, Buffalo, N. Y., assignor to General Electric Company, a corporation of New York Application November 26, 1949, Serial No. 129,641

3 Claims. (Cl. 250—36)

My invention relates to a system for controlling and protecting a self-biased electron discharge oscillator operating at high power levels.

In induction heating systems, the same high power oscillator is often employed with any one of a number of different work circuits, either for different heating applications or for operation at different frequencies. For example, a number of different resonant tank circuits are often arranged to be selectively switched into circuit with a high power oscillator tube. Before switching tank circuits, it is the usual practice to disconnect the high voltage anode supply source. In fact this has heretofore been important when switching in a conventional oscillator circuit of the Hartley type having grid-self-bias. Otherwise, disconnection of the tank circuit results in loss of grid bias and excessive anode current will very quickly damage or destroy the oscillator tube.

In a high power system of this prior art type, the anode switching must be done at high power levels, requiring a heavy contactor in the anode circuit, and unless interlocks are provided, there is still the danger that the tank circuit may be disconnected, unintentionally or otherwise, while the anode voltage is still applied.

In accordance with my invention, the need for anode switching is completely eliminated and the oscillator tube is positively and automatically protected against damage while switching work circuits. Very briefly, this is accomplished by employing an auxiliary bias rectifier, with its negative output terminal connected through a suitable coupling network to the grid circuit of the power oscillator tube. During normal operation, the bias voltage thus produced is effectively short-circuited to ground through a portion of the tank circuit itself, but when the tank circuit is removed from the oscillator, the oscillator tube is cut off by this negative bias to avoid damage or destruction.

It is, therefore, an object of my invention to provide a simple and reliable protective system for a high power oscillator having a disconnectable tank circuit.

Another object of my invention is to provide an improved oscillator system of this general type in which disconnection of the tank circuit automatically reduces the anode current to a value below the maximum rating of the oscillator tube.

A further object of my invention is to provide the use of switching apparatus operating at high power levels for controlling the output power of a high power oscillator, for use in inductive heating applications and the like.

The novel features which I believe to be characteristic of my invention, are set forth with particularity in the appended claims. My invention itself, however, both as to its organization and method of operation, may best be understood by reference to the following description taken in connection with the single figure of the accompanying drawing which is a circuit diagram of an oscillator system embodying my invention.

Referring to the drawing, I have shown a schematic electric circuit diagram of an induction heating system comprising a suitable full wave rectifier power supply 1, a conventional Hartley high-power, high-frequency, oscillator 2 and an auxiliary bias rectifier 3. This auxiliary bias rectifier 3 and its function in the circuit will later be described more fully. Oscillator 2 also includes a parallel resonant heating circuit 4 which is shown as a separate unit having a plurality of plug-and-jack connectors 5, 6 and 7 which enable it to be readily disconnected from and reconnected to the remaining oscillator circuits. Tank circuit 4 includes inductor 8 and capacitor 9. Depending upon its application, tank circuit 4 may take on various physical shapes and sizes.

The power supply 1 may be any suitable conventional rectifier supply which supplies anode potential to a suitable electron discharge device 10, which is preferably of the high vacuum type, having an anode 11, control grid 12 and cathode 13. The anode potential is filtered by a network comprising resistor bank 14, capacitor 15, and inductor 16, and then applied to the anode 11 of the electron discharge device 10.

Electron dischage device 10 is included in a conventional Hartley oscillator circuit which supplies the high frequency heating current to the tank circuit 4. Thus, anode 11 is connected to the upper terminal of tank circuit 4 through a blocking capacitor 17 and connector 5. Cathode 13 is connected to ground through the secondary of a filament transformer 18 and bypass capacitors 19. An intermediate tap point 20 on inductor 8 is also connected to ground through connector 6. Grid 12 is connected to the lower terminal of tank circuit 4 through a series circuit including a resistor 21, a grid capacitor 22 and grid leak 23 in parallel, and connector 7. Oscillator 2 is of the self-biasing type, grid bias being developed across grid capacitor 22 and grid leak 23 in response to grid current in electron discharge device 13. The operation of such an oscillator is well understood by those skilled in the art.

The rectifier 3, which is of conventional full-wave type, causes a negative potential with respect to ground to appear at the junction of a pair of load resistors 24 and 25. This negative voltage bias is transmitted through a coupling network consisting of a resistor 27 and choke 28 to the junction of capacitor 22 and resistor 23. When the tank circuit 4 is plugged into the circuit, the relatively low D.-C. impedance of inductor 8 effectively short-circuits this voltage to ground and only a minute fraction of it appears on the control electrode of electron discharge device 10. The rectifier circuit is preferably of the high impedance type such that effectively short-circuiting its output will not overload its electron discharge device.

When the tank circuit 4 is removed, either to replace it with a more suitable one or perhaps accidentally, the negative voltage from rectifier 3 is no longer short-circuited to ground by inductor 8, and this negative voltage is transmitted through resistors 23 and 21 to the control electrode 12 of electron discharge device 10. This negative voltage or bias may be of such a value as to completely cut off any anode current in the electron discharge device 10, or it may be adjusted, by proper selection of the values of resistors 24 and 25, to a value which will merely limit the current in the electron discharge device 10 to a safe level. Without such a bias on the control electrode of electron discharge device 10, the removal of the tank circuit 3 would cause the control electrode to be at essentially zero potential, and the high current in electron discharge device 13 would be great enough to bring about the destruction of the cathode. However, in the system shown, it is to be noted that removal of the tank circuit cuts off the high power oscillator electron discharge device without any additional switching in the anode supply circuit.

While I have shown a particular circuit designed to operate in accordance with my invention, it will be understood that this is by way of illustration of the principles involved and that those skilled in the art may make many modifications in the circuit arrangement and mode of operation. For example, the oscillator 2 may be a push-pull type. Therefore, I contemplate by the appended claims to cover any such modifications as fall within the true spirit and scope of this invention.

What I claim as new and desire to secure by Letters Patent of the United States is:

1. An oscillator protective system comprising an electron discharge device having anode and grid circuits, a source of operating potential for said anode circuit, a resonant tank circuit having an inductive branch of low resistance, said branch regeneratively coupling said circuits for generation of oscillations, a grid self-bias network in said grid circuit for biasing said device for normal operation, and an auxiliary source of negative bias potential connected in said grid circuit, said auxiliary source having a relatively high impedance, as compared to the resistance of the portion of said inductive branch included in said grid circuit, and being normally loaded by said resistance, said bias potential being sufficient to prevent damage to said device from excessive anode current when said inductance is disconnected from said grid circuit while anode potential is applied.

2. An oscillator protective system comprising an electron discharge device having an anode, cathode, and control grid, a source of anode operating potential connected between said anode and cathode, a parallel-resonant load circuit including an inductance, a connection from one terminal of said circuit to said anode, a connection from the other terminal of said circuit to said grid through a detachable connector and through a grid self-bias network in the order named, a connection from an intermediate tap point on said inductance to said cathode through a detachable connector, and an auxiliary source of grid bias potential having its positive terminal connected to said cathode and its negative terminal connected to said grid through said network, said source being normally substantially short-circuited by the portion of said inductance included between said connectors, the potential of said auxiliary source being sufficient to limit the anode current in said device to a non-destructive value when either of said connectors is disconnected while anode potential is applied.

3. A protective system for a high-power oscillator of the Hartley type, comprising an electron discharge device having grid and anode circuits, means for impressing anode operating potential on said anode circuit, a resonant tank circuit including an inductance regeneratively coupling said grid and anode circuits for generation of oscillations, a grid self-bias network in said grid circuit for establishing a normal anode operating current, said resonant circuit being mechanically arranged for connection and disconnection as a unit to and from the remainder of said circuits, whereby said device loses its self bias and tends to draw destructive anode current if said resonant circuit is disconnected while anode potential is applied, and an auxiliary protective source of negative bias potential connected in said grid circuit, said source having a relatively high impedance and being normally loaded by the relatively low-impedance portion of said inductance in circuit therewith, the voltage of said source being sufficient, upon disconnection of said resonant circuit, to limit said anode current to a safe value insufficient to damage said device.

PAUL B. MAGEE.

REFERENCES CITED

The following references are of record in the file of this patent:

UNITED STATES PATENTS

| Number | Name | Date |
|---|---|---|
| 1,938,160 | Wallace | Dec. 5, 1933 |
| 2,503,073 | Schreiner | Apr. 4, 1950 |